United States Patent

Al-Yazdi

[11] Patent Number: 5,004,552
[45] Date of Patent: Apr. 2, 1991

[54] APPARATUS AND METHOD FOR SEPARATING WATER FROM CRUDE OIL

[76] Inventor: Ahmed M. Al-Yazdi, ADCO, P.O. Box 270, Abu Dhabi - VAE, United Arab Emirates

[21] Appl. No.: 537,695

[22] Filed: Jun. 14, 1990

[51] Int. Cl.⁵ .............................................. B01D 21/26
[52] U.S. Cl. .................... 210/789; 210/800; 210/294; 210/512.1
[58] Field of Search ............... 55/52, 55, 459.1; 210/512.1, 512.2, 787–789, 294, 800, 511, 519

[56] References Cited

U.S. PATENT DOCUMENTS

| | | |
|---|---|---|
| 1,021,689 | 8/1933 | Meurk . |
| 3,346,117 | 10/1967 | Page, Jr. . |
| 3,768,658 | 10/1973 | Palma .................. 210/512.1 X |
| 3,875,061 | 4/1975 | Palma .................. 210/512.1 X |
| 3,951,813 | 4/1976 | Palma .................. 210/512.1 X |
| 4,116,790 | 9/1978 | Prestridge . |
| 4,179,273 | 12/1979 | Montusi .................. 210/512.1 X |
| 4,241,787 | 12/1980 | Price . |
| 4,343,707 | 8/1982 | Lucas . |
| 4,414,112 | 11/1983 | Simpson et al. . |
| 4,531,584 | 7/1985 | Ward . |
| 4,857,197 | 8/1989 | Young et al. . |

*Primary Examiner*—Charles Hart
*Attorney, Agent, or Firm*—Wood, Herron & Evans

[57] ABSTRACT

Method and apparatus for separating water and crude oil mixtures and other two-phase fluid mixtures of components of different densities. The mixture is pumped through a conduit in the form of a vertical spiral at a velocity that impels the heavy phase toward the outside of the spiral. A fraction is withdrawn from the outside of the turns of the spiral and is led downwardly to the bottom of a vertical settling tank. Any light phase removed with the heavy phase floats to the top in the settling tank and is reintroduced at the top of the spiral.

24 Claims, 2 Drawing Sheets

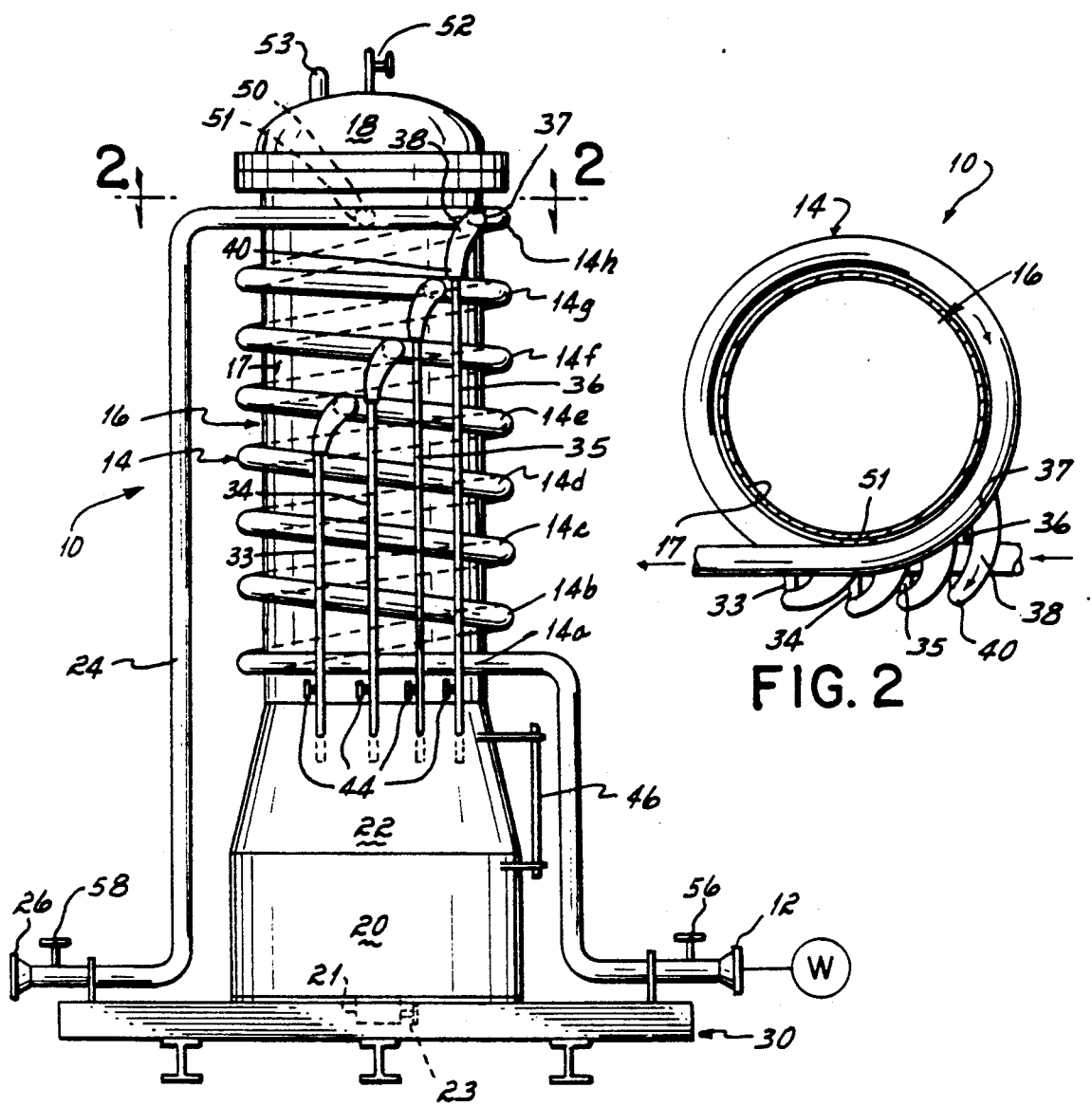
FIG. 1
FIG. 2
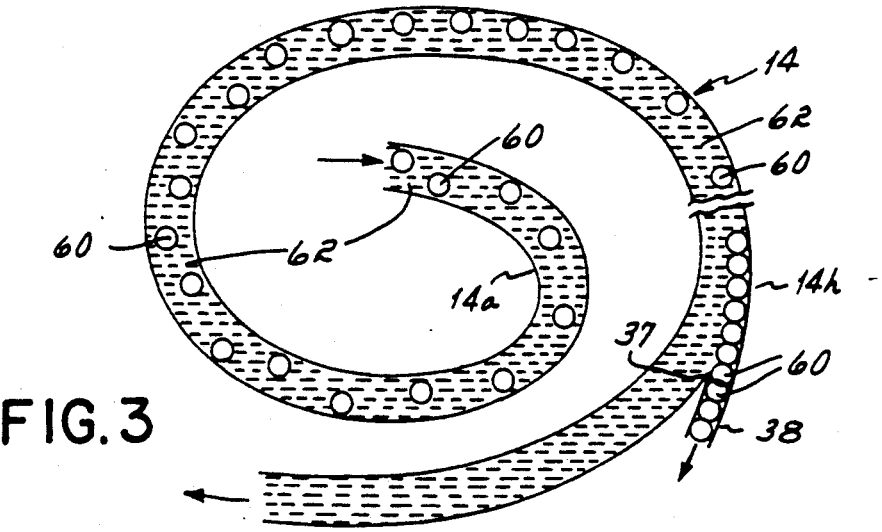
FIG. 3

APPARATUS AND METHOD FOR SEPARATING WATER FROM CRUDE OIL

FIELD OF THE INVENTION

This invention relates generally to the separation of an undesired phase from a main phase of different density in a fluid mixture. The invention especially relates to the separation of water from crude oil.

BACKGROUND

As it comes from the ground, crude oil sometimes contains a substantial proportion of water which is in the form of discrete droplets dispersed in the oil; the oil is the continuous phase. Such crude is often referred to as "wet crude." The water may be present for any of several reasons. The rise of the oil-water contact level in the underground oil producing formation may give rise to "coning" of water at high well flow rates; or water may be continuously admixed with the oil if the water level covers part of the producing zone. Where the oil is in a stratified formation zone, "lenses" of water may be trapped within the oil zone and be produced with the oil until all the water has been depleted.

Whatever its source, it is desirable to separate such admixed water before the crude is refined. Moreover, in many or most cases the water contains dissolved salt which itself is a serious detriment. High salt content may prevent bulk transportation of wet crude; and in any event salt causes corrosion in flow lines, separators and storage tanks.

Separation of admixed water is complicated by the fact that the water is generally in emulsion form. Emulsification occurs as the water travels with the oil through the well conduit, flow lines and degassing facilities. The constant agitation of the mixture in the well bore during production, and above ground in flow lines and processing vessels, causes the water to emulsify; release of dissolved gas as the line pressure drops can also contribute to emulsification. The emulsified water is often in the form of small droplets which have high surface tension and can be very difficult to separate by normal (gravity) settling. The emulsion can be especially tight and difficult to break if the proportion of emulsified water is small.

THE PRIOR ART

The earliest method of separating salt water from oil was gravity separation, that is, by simply letting the mixture sit. The water droplets tend to coalesce; being heavier than the oil, the coalesced water settles to the bottom the oil is skimmed from the top. Where the proportion of water is relatively large and/or the degree of emulsification is low (large droplets), multiple phase separators can be used. A three-phase separator has sometimes been used to separate oil, water and gas, the oil and water being separated by gravity separation while the gas is released.

In other situations, the oil, after leaving a separator, is mixed with a small amount of fresh water in order to facilitate mixing of the remaining salt water with the added water for further settlement in storage tanks. This also reduces the overall salinity level of any water remaining in the oil, to a level suitable for bulk transportation.

Where the water emulsion is so tight that it cannot be separated by the means described above, other processes are used. One such technique is called the "heater-treater" method, in which a de-emulsifying agent is added to break the emulsion after the oil has been degassed. Small amounts of fresh water are then added and the mixture is passed through heating vessels in order to reduce the viscosity of the oil and thereby facilitate separation of water. The mixture of oil and water is then passed through an electrostatic desalting unit having electrode plates across which a high electric potential is maintained. The charges in the electrodes polarize the droplets of water passing between them, causing the droplets to be attracted to one another, depending on their charges. The larger water masses then settle out more easily. However, the removal of water by such electrostatic desalters is expensive and requires substantial power input.

It is also known in the prior art to utilize centrifugal separation to separate water from oil. Meurk U.S. pat. No. 1,921,689 shows a method for separating oil from water in the bilge of a tanker using spiral flow over baffles.

Page U.S. pat. No. 3,346,117 shows an apparatus for de-emulsifying oil as it comes from a well. There the contaminated oil goes first into a horizontal inner spiral conduit of small diameter tubing, then to an outer spiral of larger diameter around the inner spiral. Centrifugal force in the spiral urges the water droplets to the outside of the conduit at the bottom, and it can pass outwardly through openings at the bottom of the outer spiral, into a surrounding tank from which it is periodically drained.

Prestridge U.S. pat. No. 4,116,790 shows a centrifugal separator through which water is introduced into a cyclone from which it spins out the bottom. Simpson U.S. pat. No. 4,414,112, shows another cyclone-type separator having a vortex tube with a vertically adjustable finder.

Price U.S. pat. No. 4,241,787 shows a downhole centrifugal separator in which oil flowing up the bore hole is passed through spirally wound tubes of semipermeable membranes. Water gravitates to the outside of the spiral and then passes outwardly through the membrane. Lucas U.S. pat. No. 4,343,707 shows a technique involving spiral flow to separate magnetic particles from water.

In Ward U.S. pat. No. 4,531,584, an oil-gas mixture flows up a spiral or auger-like ramp, the lighter gas being taken off through inside openings.

Young U.S. pat. No. 4,857,197 shows introducing an oil/water mixture downwardly through a vertical inlet pipe into an inwardly tapering cyclone.

A need exists for a more efficient, less capital intensive means to separate admixed water, including salt water, from oil.

BRIEF DESCRIPTION OF THE INVENTION

This invention provides a new apparatus and method for dewatering crude oil and other mixtures of immiscible phases. The invention uses the kinetic energy of the moving liquid itself to induce separation; it does not require a long settling period, and in fact the separation can be made as the oil is flowing from a well to a tank or degasser.

In accordance with a preferred form of the invention, a water-in-oil emulsion is caused to flow through a pipe or tube in the form of a vertically oriented coil or spiral. The velocity of flow in the spiral is such that centrifugal force moves the water droplets (which are denser than the oil phase in which they are carried) outwardly in the spiral, toward the outside of the passage where they form an outer, water-rich heavier fraction. This fraction is drawn off laterally through skimmer ports spaced along the outside of the spiral, in at least the upper turns of the spiral. The fraction so separated (mostly water but some oil may still be mixed with it) is directed from the skimmer ports downwardly into a vertical or elongated tank, near the bottom of the tank. The tank is preferably set in the center of the spiral. Oil entrained with the skimmed water-rich fraction floats to the top of the water in the tank. Near its top, the tank is connected to the top of the spiral passage by a return line, and through this return line oil floating on top of the water in the tank is added back to the now stripped oil in the spiral. If sufficiently high, the pressure of crude oil at the outlet of the well can be used to "drive" the flow through the spiral by causing the mixture to spin at a velocity that achieves useful separation. It is believed that inlet pressures of at least about 200 psi will be sufficient for the majority of water/crude oil separations. Pumping is not necessary with many new wells, but a pump may be used where natural pressure is low. High separation effectiveness can be attained by this apparatus and technique.

DESCRIPTION OF THE DRAWINGS

FIG. 1 is an elevation of separating apparatus for separating water from crude oil, in accordance with a preferred embodiment of the invention;

FIG. 2 is a cross sectional view of the apparatus taken on line 2—2 of FIG. 1;

FIG. 3 is a diagrammatic view showing how water droplets are progressively separated as they flow along the spiral coil;

DETAILED DESCRIPTION

Figure 4:
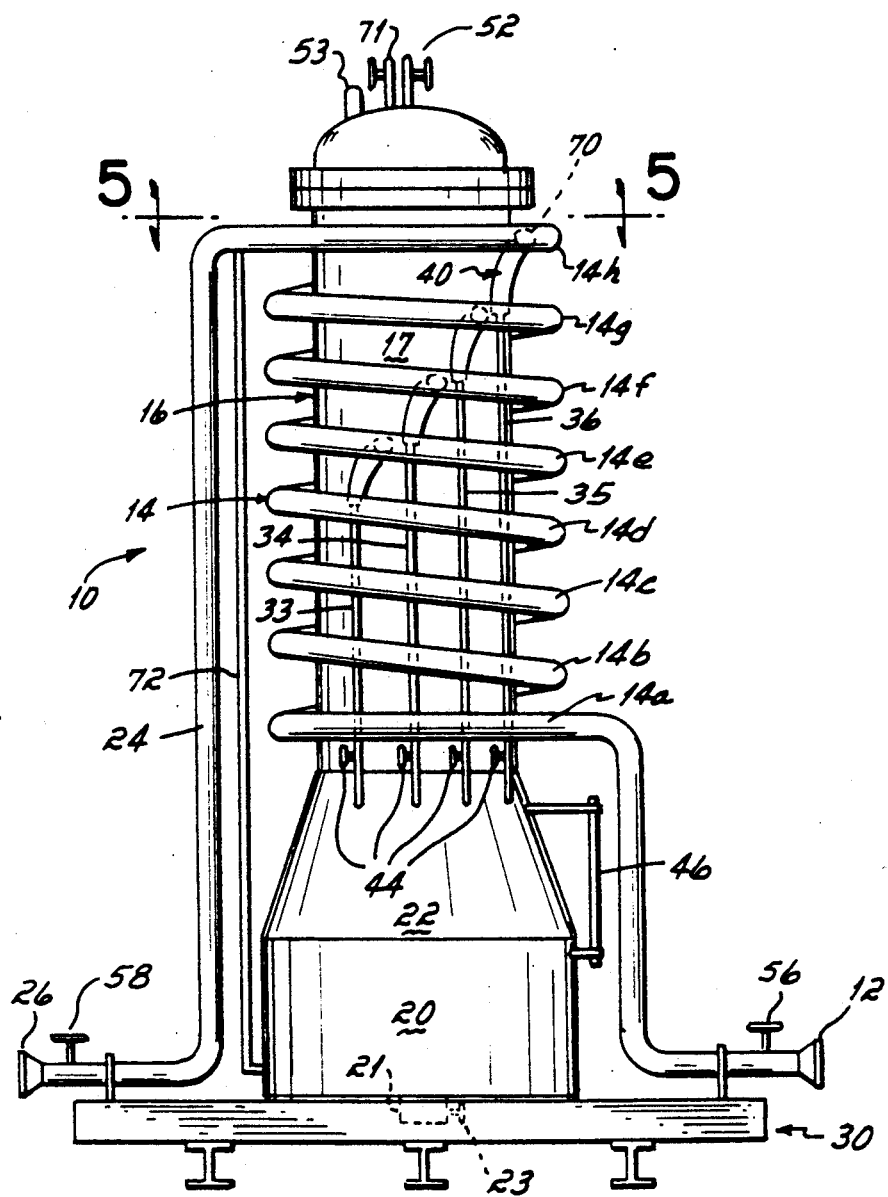
FIG. 4 is an elevation of apparatus for separating a light phase from a heavy phase, in accordance with a second embodiment of the invention.

Referring to FIG. 1, apparatus 10 in accordance with a preferred form of the invention receives a mixture of immiscible phases of different densities, such as a salt water-in-oil emulsion, through an inlet connection 12. The inlet may be connected directly to a well head W or other pressure source. The mixture flows into a spiral coil or conduit 14 of tube or bent pipe, preferably having at least 4 turns. The coil 14 has a generally vertical axis and, in the embodiment shown, comprises about 8 turns, designated respectively as 14a–14h. From topmost coil turn 14h the pipe turns downwardly to an outlet connection 26.

Coil 14 preferably surrounds or encircles a relatively tall or elongated vertical settling tank or reservoir 16. The tank has an upper cylindrical portion 17 which sits within the pipe coils which encircle its vertical side wall. Upper cylinder 17 is closed at the top by a domed cap 18.

Below the first (lowest) turn 14a of pipe coil 14, upper cylinder 17 of the tank is connected by a downwardly and outwardly tapering intermediate tank portion 22 to a lower cylinder or tank base 20 of larger diameter. At the bottom, tank lower cylinder 20 is closed by a plate with a drain line 21 having a valve 23.

Dense phase outlet or skimmer ports 37 are provided along the outer circumferential side of at least the top several coil turns, four such ports being shown in FIG. 1, on turns 14e, f, g, and h. Each port 37 is connected, as nearly tangential to the direction of flow as is practical, through a downturned elbow 38 and a size reducer 40 to a downwardly extending skimmer take-off line or down tube, the respective take-off lines being designated as 33–36 respectively. Each line 33–36 includes a sampling port and a valve 44 and leads into tank 16 below the coil, through the tapered sidewall of intermediate tank portion 22 thereof. A sight glass 46 (or other device for indicating the liquid level) is installed between lower cylinder 20 and intermediate section 22 to facilitate maintaining a desired low level of separated water in the tank. (Separated water is removed through drain line 21 and valve 23. The separated water is desirably sent to a gravity settling tank, not shown, for further skimming before disposal.)

Downstream of skimmer port 37 in topmost coil turn 14h, upper cylinder 17 is connected, near its top, by a return line 51 (see FIG. 2) to top coil turn 14h. Return line 51 enters the coil through a return port on the inside circumference of the coil. A safety valve 53 and pressure gauge 52 are mounted to the domed top 18 of cylinder 17.

The entire assembly described may be mounted on a base or skid designated generally at 30, of crossed I beams, so as to be more easily transportable from site to site.

In operation, a crude oil/salt water (or other) mixture flows under pressure through inlet 12 into the lower coil turn 14a, and spins around an uprising spiral path through the successive turns 14b, c, d, etc. The water droplets are denser (of higher specific gravity) than the oil phase in which they are contained, and centrifugal force arising from flow around the spiral differentially moves the water droplets outwardly toward the outer perimeter of the spiral conduit.

The centrifugal force F acting on a unit volume of liquid moving around a circular path is:

$$F = \frac{mV^2}{R}$$

where m is the mass of the unit volume, V its velocity, and R the radius of the spiral. It can be seen that for a coil of given radius R, the separating force F increases rapidly with the velocity V of the flow; the force diminishes inversely as radius increases. The centrifugal force on a water droplet of given volume is greater than that acting on an equal volume of oil because of the greater density (and hence mass m) of water. It is that greater force which differentially urges the water droplets toward the outside of the spiral conduit. FIG. 3 illustrates the separation diagrammatically, the denser water droplets being designated by 60 in a continuous lighter (oil) phase 62.

Skimmer ports 37 need not necessarily be provided in the first few coil turns, in which the segregation is just beginning to take place; but they should be provided in the upper turns. After flowing around the first few turns, the water droplets tend to accumulate along the outer periphery of the flow passage through coil turns 14f, g, h and i. The water-droplet droplet rich fraction is driven through the ports 37; gravity assists in causing it to flow to down lines 33–36 into the lower part of tank 16. The sampling ports 44 can be checked periodically to determine the separation of water at each turn; for example, if the uppermost turn shows a salt content similar to that at outlet 26, this would indicate the need for higher inlet pressure (to increase flow velocity) and/or the desirability of adding a de-emulsifier upstream of the coil.

The separated fraction, which enters the tank below the coil, contains a large proportion of water with some oil still admixed with it. The water droplets coalesce in tank 16 and the residual oil rises to the top of the water in upper cylinder 17. This oil can flow from the top of the upper cylinder 17 outwardly to the coil via return line 51 and port 50, to the inside of the coil turn. Inlet and outlet valves 56, 58 can be used to regulate the velocity of flow through the coil.

The tall configuration of the tank minimizes the area of the water/oil interface and improves the rate of gravity settling of the water phase. Carryback of water through return line 51 is minimized because the return line is near the top of the tank, well above the interface.

The generally upward direction of flow through the coil contributes to the effectiveness of the separation. The centrifugal force on the water droplets is transverse to gravity; gravity tends to separate water drops downwardly, toward the bottom of the spiral passage, whereas centrifugal force moves the water droplets outwardly. Water drops which would otherwise tend to collect in the bottom of the pipe are swept upwardly by the current, offsetting gravity, and are spun outwardly, whereas if the direction of flow were downward, current would assist gravity in urging the particles to the middle bottom of the passage. Moreover, if flow were downward, a return port at the bottom coil would be close to the interface. (If at the top, separated oil would be reintroduced into the incoming wet crude.)

Return of oil at the top offsets or compensates for the volume removed through the skimmer ports. As the separated portion flows into the tank at the bottom, an equal volume of separated oil is returned from the tank to the top of the coil. The efficiency of separation is significantly improved by this return flow.

It is desirable that the take-off lines extending from port 37 be as nearly tangent as is feasible to the direction of flow where they lead from the coil turns. An abrupt change in the direction of flow through these lines or elbows 38 would add turbulence and hinder separation. Optimally the skimmer ports should extend over the outer half of the section of the pipe. The diameter of the downtube is preferably reduced, as shown, to slow the flow rate and thereby reduce agitation when the skimmed faction enters the tank. For the same reason, it is also desirable that the lines 33-36 all enter the tank at the same low level; introduction of the separated fraction to the tank at different levels would tend to agitate the separating phases in the tank and the fluid returned to the coil could contain some water.

In a preferred embodiment, upper cylinder 17 is a steel tube having an outside diameter of 36 inches and a height of 7 feet. Lower cylinder 20 has a diameter of 48 inches and a height of 2 feet. The intermediate portion 22 is a 48-36 inch reducer, 2 feet in height. Coil 14 comprises 80 feet of 4 inch diameter pipe, wound in a spiral of eight turns of slightly more than 36 inches in inside diameter, so as to fit closely around the upper cylinder. The skimmer ports 37 are 4 inch diameter openings cut in the outside of turns 14e, f, g and h. To each of these ports 37 is welded a short, nearly tangential length of 4 inch diameter pipe, which leads into a downturned elbow 38 and a 4-2 inch reducer 40 and then to a 2 inch take-off line 33-36. Return port 50 is 2 inches in diameter, and is connected to a 2 inch line 51.

The apparatus is connected in the path of flow of the two-phase fluid mixture to be separated. Inlet 12 can receive flow directly from a well or from a gas separation unit, as may be feasible. With outlet valve 58 closed, the oil/water mix is permitted slowly to fill tank 16. Air and released gas are bled through valve 52 at the top of the tank. After the tank is completely full, valve 58 is opened and through flow starts. As the wet crude flows through the first part of the coil, the water droplets tend to move to the outside portion of the spiral flow passage, and when flow reaches the upper coil turns, this outside portion is withdrawn through the skimmer ports 37 and flows downwardly to enter the tank. Water collects in lower cylinder 20 and any oil rises to top of it and is re-introduced through return port 50; the separated water is periodically drained to disposal through drain 21. It is calculated that desalination percentages (salt removed/salt present in feed, x 100%) of 90% or higher can be attained. The use of a de-emulsification agent may further facilitate separation of the water.

As indicated, well pressure can be used to drive the flow through the coil. However, in the absence of sufficient natural pressure, a pump may be used to drive the mixture through the spiral at a velocity sufficient to achieve an effective degree of separation.

The foregoing description contemplates that the apparatus is being used to separate salt water drops from crude oil. However, in principal the invention can be used to separate emulsions and suspensions of other fluids or particles in two phases of different specific gravities. For example, the apparatus can be used to separate drilling fluid from oil, upon commissioning of a well; or as a scrubber to separate water and other condensates from gas. In general the apparatus is useful to separate two phase mixtures of different densities, including gas/condensate; liquid/liquid; and liquid/solid mixtures. (In the latter case, solid particles can be disposed of through a hatch or flanged opening.)

Figure 5:
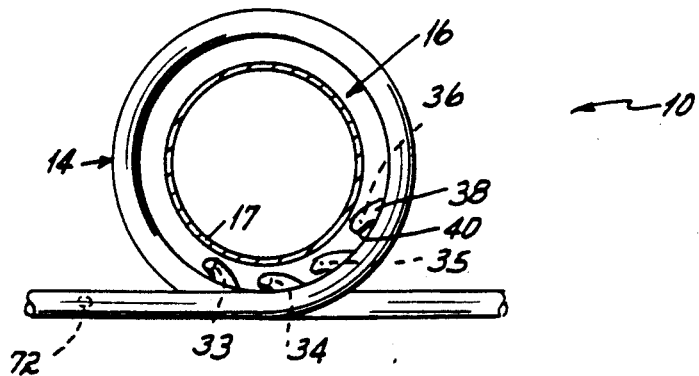
FIG. 5 is a cross-sectional view taken on line 5—5 of FIG. 4.

FIGS. 4 and 5 show a modified form of the apparatus of the invention, for separating a contaminant light phase from a heavy phase. This apparatus is generally like that of FIGS. 1 and 2, except that skimmer ports 70 are provided on the inside of the coil turns rather than the outside, a light phase removal port or drain 71 is provided at the top of the tank, and a return line 72 extends from the bottom of the tank to the uppermost coil turn 14h. In this embodiment the separated (light) fluid is at the top of the tank and heavy fluid is returned from the bottom of the tank to the coil outlet line, preferably near the top of the coil.

Having described the invention, what is claimed is:

1. Apparatus for separating a fluid mixture of a heavy phase from a light phase in a fluid mixture, comprising,
   a spiral conduit in the form of a vertical coil of a plurality of turns,
   an inlet at one end of said conduit and an outlet at a second end of said conduit,
   means for moving the mixture of phases through said conduit at a velocity such that said heavy phase segregates in said conduit along the outside of said turns of said coil,
   skimmer ports in said conduit along the outside of at least several upper turns of said coil;
   a separating tank, and take-off lines connecting the skimmer ports to said tank below said ports.

2. Apparatus for separating a light phase from a heavy phase in a fluid mixture, comprising, a spiral conduit in the form of a vertical coil of a plurality of turns, an inlet at one end of said conduit and an outlet at a second end of said conduit, means for moving the mixture of phases through said conduit at a velocity such that said light phase segregates in said conduit along the inside of said turns of said coil, skimmer ports in said conduit along the inside of at least several upper turns of said coil, a separating tank, and take-off lines connecting the skimmer ports to said tank below said ports.

3. The apparatus of claim 1 or 2 comprising a return line from said tank to said conduit, downstream of at least some of said skimmer ports.

4. The apparatus of claim 1 wherein a return line extends from said tank at a position adjacent the top thereof, to the inside wall of said coil.

5. The apparatus of claim 4 wherein said return line connects said tank to the topmost turn of said coil.

6. The apparatus of claim 2 wherein a return line extends from said tank at a position adjacent the bottom thereof, to said coil.

7. The apparatus of claim 6 wherein said return line connects said tank to the uppermost turn of said coil.

8. The apparatus of claim 1 or 2 wherein said tank is situated within the turns of said coil.

9. The apparatus of claim 1 or 2 wherein said tank is vertically elongated.

10. The apparatus of claim 1 or 2 wherein said said skimmer ports are in successive turns of said coil and each port is connected downwardly by a separate take-off line to said tank.

11. The apparatus of claim 1 or 2 wherein the takeoff lines enter said tank adjacent its bottom.

12. The apparatus of claim 1 or 2 wherein said conduit leads said mixture upwardly from said inlet through said turns.

13. The apparatus of claim 1 or 2 wherein said spiral has more than 4 turns.

14. The method of separating a heavy phase and a light phase in a fluid mixture, comprising, passing the mixture through a vertical, spiral tubular coil, at a velocity sufficiently high that the heavy phase is concentrated toward the outside of the turns of the coil as the mixture flows around the spiral and the light phase is concentrated toward the inside of the turns, withdrawing a fraction of the fluid from at least one upper turn of the coil, said fraction being withdrawn from the outside of said coil if the heavy phase is to be removed and from the inside of said coil if the light phase is to be removed, conducting the withdrawn fraction downwardly to a settling tank, permitting the withdrawn fraction to further separate into the heavy phase and the light phase, and admitting light phase from the top of said settling tank to said coil adjacent the top of the coil if the heavy phase is to be removed, and heavy phase from the bottom of said settling tank to said coil adjacent the top of said coil if the light phase is to be removed.

15. The method of claim 14 wherein said mixture is passed upwardly through said coil.

16. The method of claim 14 wherein said withdrawn fraction is the heavy phase and is withdrawn from the outside of said coil.

17. The method of claim 14 wherein said withdrawn fraction is the light phase and is withdrawn from the inside of said coil.

18. The method of claim 14 wherein said withdrawn fraction is withdrawn substantially tangentially from said coil.

19. The method of claim 14 wherein said light phase is introduced from the top of said settling tank to said coil on the inside of a turn of said coil.

20. The method of claim 14 wherein said withdrawn fraction enters said tank below said coil and near the bottom of said tank.

21. The method of claim 14 wherein said heavy phase settles to and is drained from the bottom of the tank.

22. The method of claim 14 wherein the velocity of the withdrawn fraction is reduced as it is conducted downwardly to said tank.

23. The method of claim 14 wherein said heavy phase is introduced from the bottom of said settling tank to a turn of said coil.

24. The method of claim 14 wherein said light phase floats to and is drained from said top of the tank.

* * * * *